(12) United States Patent
Dwivedi

(10) Patent No.: US 11,724,887 B2
(45) Date of Patent: Aug. 15, 2023

(54) SYSTEM AND METHOD FOR FIX PITCH PARCEL DISTRIBUTION

(71) Applicant: Körber Supply Chain LLC, DFW Airport, TX (US)

(72) Inventor: Rajeev Dwivedi, Plano, TX (US)

(73) Assignee: Körber Supply Chain LLC, DFW Airport, TX (US)

( * ) Notice: Subject to any disclaimer, the term of this patent is extended or adjusted under 35 U.S.C. 154(b) by 109 days.

(21) Appl. No.: 17/288,108

(22) PCT Filed: Jan. 3, 2019

(86) PCT No.: PCT/US2019/012151
§ 371 (c)(1),
(2) Date: Apr. 23, 2021

(87) PCT Pub. No.: WO2020/142099
PCT Pub. Date: Jul. 9, 2020

(65) Prior Publication Data
US 2022/0112034 A1  Apr. 14, 2022

(51) Int. Cl.
*B65G 43/08* (2006.01)
*B65G 43/10* (2006.01)
*B65G 47/31* (2006.01)

(52) U.S. Cl.
CPC ............. *B65G 43/08* (2013.01); *B65G 43/10* (2013.01); *B65G 47/31* (2013.01);
(Continued)

(58) Field of Classification Search
CPC ........ B65G 43/08; B65G 43/10; B65G 47/31; B65G 2201/0285; B65G 2203/0233; B65G 2203/025
(Continued)

(56) References Cited

U.S. PATENT DOCUMENTS

| 7,631,747 | B2 | 12/2009 | Zeitler |
| 9,790,035 | B2 | 10/2017 | Neiser et al. |

(Continued)

FOREIGN PATENT DOCUMENTS

| CA | 2979200 A1 * | 3/2018 | ............. B65G 47/31 |
| EP | 3036166 A1 | 2/2015 | |

(Continued)

OTHER PUBLICATIONS

PCT International Search Report and Written Opinion of International Searching Authority dated Sep. 24, 2019 corresponding to PCT International Application No. PCT/US2019/012151 filed Jan. 3, 2019.

Primary Examiner — Gene O Crawford
Assistant Examiner — Lester Rushin, III
(74) Attorney, Agent, or Firm — Price Heneveld LLP

(57) ABSTRACT

A system (500) for distributing a stream of articles (100) at a fix pitch (P) includes a belt assembly (250) with belt segments (252) carrying a stream of articles (100), a sensor assembly (510) with sensors (512), a control system (550) interfacing with the belt assembly (250) and the sensor assembly (510), wherein the sensor assembly (510) provides measurements of initial positions of each article of the stream of articles (100) and transmits the measurements to the control system (550), wherein the control system (550) utilizes the measurements to determine deficits of the initial positions to final positions for each article based on a predefined pitch value (P), and wherein the control system (550) controls a speed of the plurality of belt segments (252) to provide the final positions for each article according to the predefined pitch value (P).

15 Claims, 5 Drawing Sheets

(52) U.S. Cl.
  CPC ............. *B65G 2201/0285* (2013.01); *B65G 2203/025* (2013.01); *B65G 2203/0233* (2013.01)

(58) Field of Classification Search
  USPC ........................................ 198/358
  See application file for complete search history.

(56) References Cited

U.S. PATENT DOCUMENTS

| | | | |
|---|---|---|---|
| 10,647,520 B2 * | 5/2020 | Hartmann | B65G 43/10 |
| 10,773,898 B2 * | 9/2020 | Perrot | B65G 47/31 |
| 2008/0023302 A1 * | 1/2008 | Groom | B65G 47/268 198/781.06 |

FOREIGN PATENT DOCUMENTS

| | | | | |
|---|---|---|---|---|
| EP | 3929111 A1 * | 12/2021 | | B65G 1/0464 |
| WO | 0240385 A1 | 5/2002 | | |
| WO | 2008042294 A2 | 4/2008 | | |

\* cited by examiner

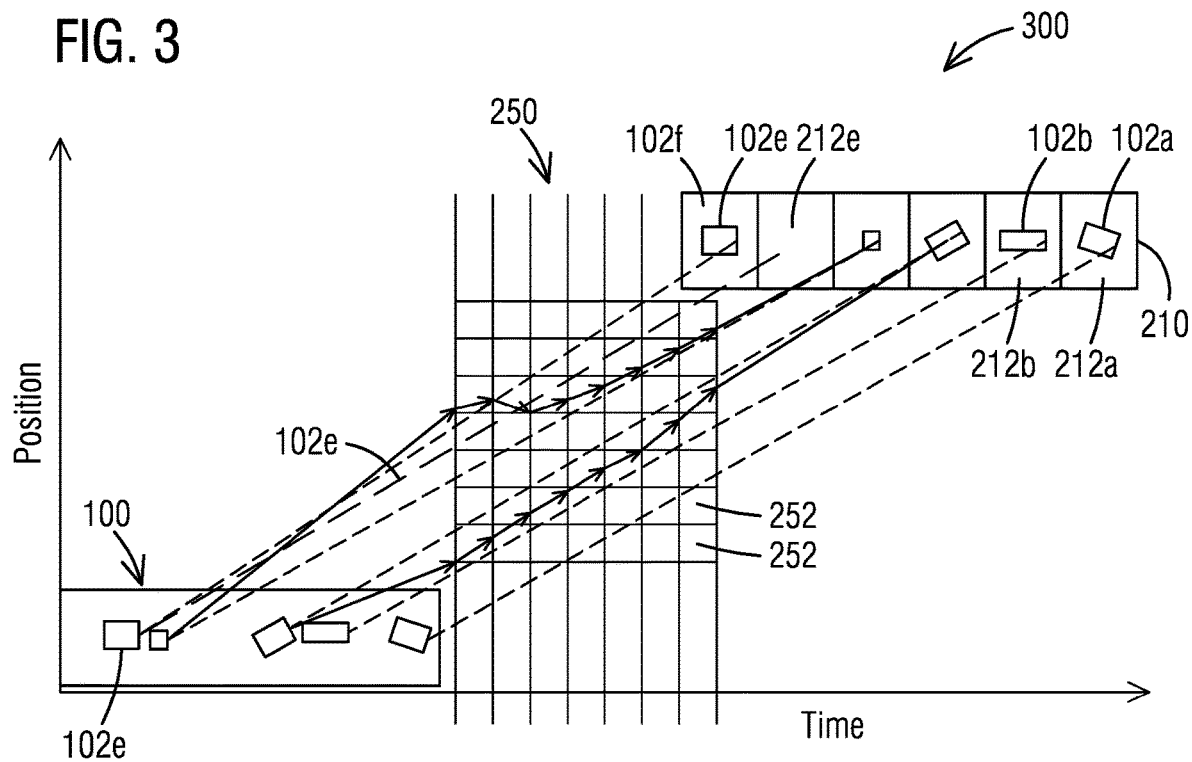
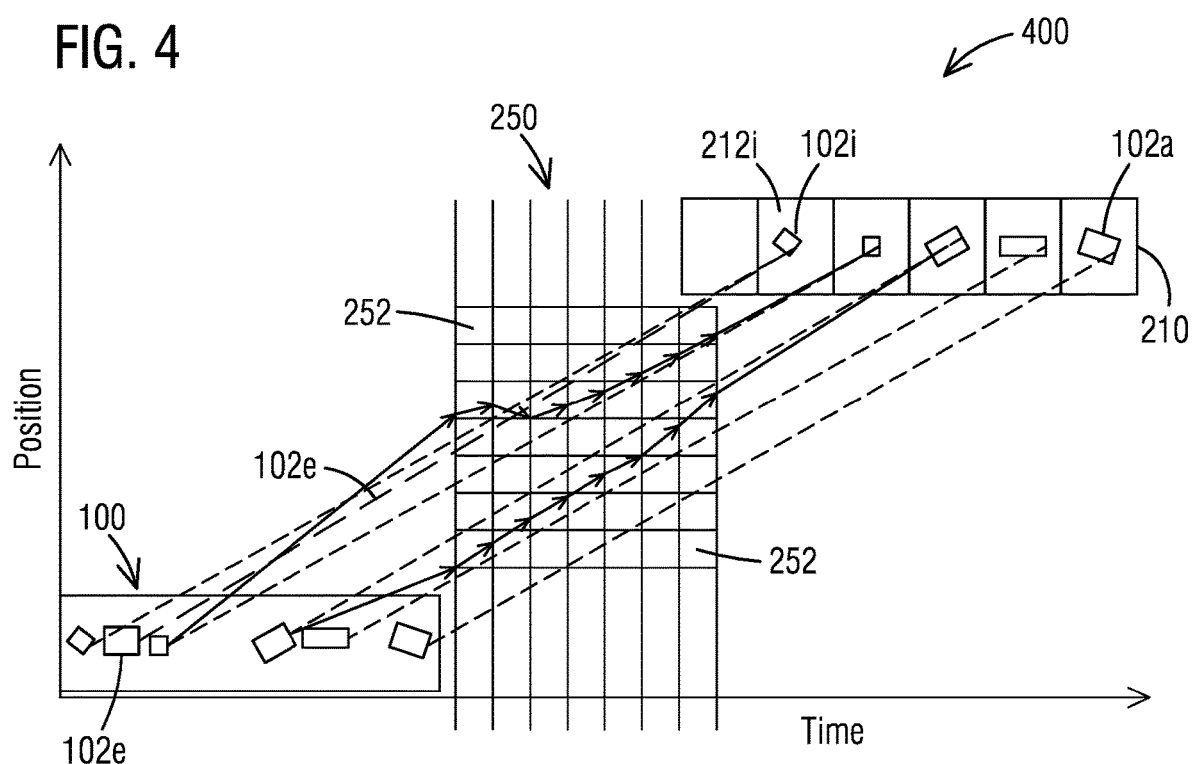

SYSTEM AND METHOD FOR FIX PITCH PARCEL DISTRIBUTION

BACKGROUND

1. Field

Aspects of the present disclosure generally relate to the technical field of mail and parcel processing techniques.

2. Description of the Related Art

An automatic parcel singulation system, herein also referred to as singulator, transforms a bulk flow of articles, such as for example parcels or packages, into an aligned flow. "Singulation" refers to the re-arrangement of a disordered flow or stream of articles into one or more single-file output streams. A distinguishing feature of a singulated stream as the absence of side-by-side articles. Further, consecutive articles are separated by a gap. Singulation is called for in applications where articles, e.g. parcels, originating from a bulk process need to undergo serial processing steps. Bulk processes include unloading, dumping, depalletizing, etc. Serial processing steps include bar code scanning, metering, weighing, labelling, diverting, etc.

An end goal of singulators is to be able to deliver individual articles, e.g. parcels or packages, at a fix pitch onto sorters or sortation systems. Currently, singulators need significant human intervention in order to provide singulation at fix pitch. Additionally, an increase in quality translates in reduced throughput.

SUMMARY

A first aspect of the present disclosure provides a system for distributing a stream of articles at a fix pitch comprising a belt assembly comprising a plurality of belt segments carrying a stream of articles, a sensor assembly comprising a plurality of sensors, a control system interfacing with the belt assembly and the sensor assembly, wherein the sensor assembly provides measurements of initial positions of each article of the stream of articles and transmits the measurements to the control system, wherein the control system utilizes the measurements to determine deficits of the initial positions to final positions for each article based on a predefined pitch value, and wherein the control system controls a speed of the plurality of belt segments to provide the final positions for each article according to the predefined pitch value.

A second aspect of the present disclosure provides a method for distributing a stream of articles at a fix pitch value comprising, through operation of at least one processor in a control system configured via executable instructions included in at least one memory, receiving measurements of initial positions of a stream of articles travelling on a first belt segment, determining deficits in the initial positions with respect to final positions based on a predefined pitch value, and controlling a speed of a second belt segment such that the stream of articles comprises the final positions including the predefined pitch value.

A third aspect of the present disclosure provides a non-transitory computer readable medium comprising instructions that when executed by at least one processor perform a method for distributing a stream of articles at a fix pitch as described herein.

BRIEF DESCRIPTION OF THE DRAWINGS

FIG. 3 depicts a schematic view of a second diagram in combination with a belt assembly and stream of articles in accordance with an exemplary embodiment of the present disclosure.

FIG. 4 depicts a schematic view of a third diagram in combination with a belt assembly and stream of articles in accordance with an exemplary embodiment of the present disclosure.

DETAILED DESCRIPTION

To facilitate an understanding of embodiments, principles, and features of the present disclosure, they are explained hereinafter with reference to implementation in illustrative embodiments. In particular, they are described in the context of being a system and a method for singulating or distributing a stream of articles, such as for example parcels or packages, at fix pitch. Embodiments of the present disclosure, however, are not limited to use in the described systems or methods.

The components and materials described hereinafter as making up the various embodiments are intended to be illustrative and not restrictive. Many suitable components and materials that would perform the same or a similar function as the materials described herein are intended to be embraced within the scope of embodiments of the present disclosure.

Figure 1:
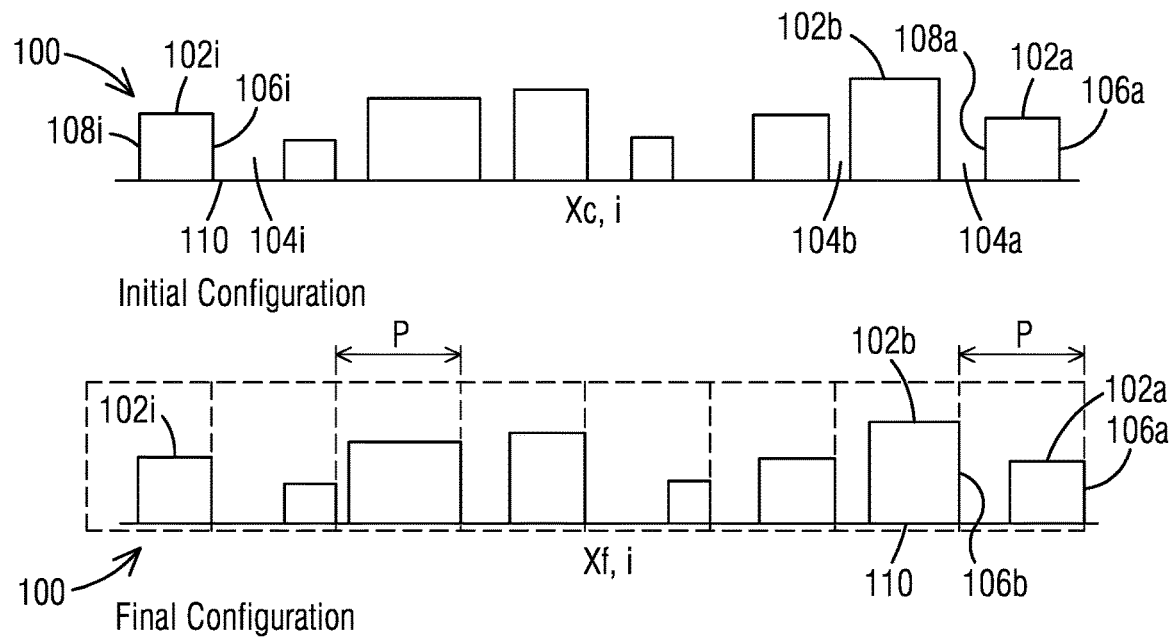
FIG. 1 depicts a schematic view of an initial and final configuration of a stream of articles for fix pitch adjustment in accordance with an exemplary embodiment of the present disclosure.

FIG. 1 depicts a schematic view of an initial and final configuration of a stream of articles in accordance with an exemplary embodiment of the present disclosure. The stream of articles comprises for example parcels, and it should be noted that the terms parcel and package are used interchangeably herein.

Bulk parcel flow requires singulation (i.e., each parcel is uniformly separated, spaced, and aligned) before entering a downstream automated sorting/sortation system. As noted before, an end goal of singulators is to be able to deliver individual articles, e.g. parcels or packages, at a fix pitch onto sorters or sorting systems. Currently, singulators need significant human intervention in order to provide singulation at fix pitch.

Determining a Position of a Package at Fix (Uniform) Pitch

FIG. 1 illustrates a stream of articles 100, for example a stream of parcels or packages 102a, 102b . . . 102i, at an initial configuration and at a final configuration with fix pitch P between the packages 102a, 102b . . . 102i. The parcels 102a, 102b . . . 102i are for example unloaded from a trailer or truck and loaded onto an incoming conveyor belt 110. The parcels 102a, 102b . . . 102i comprise different shapes and/or sizes and typically comprise different distances/gaps 104a, 104b . . . 104i between the individual parcels 102a, 102b . . . 102i. Each parcel 102a, 102b . . . 102i comprises a leading edge 106a, 106b . . . 106i and a trailing edge 108a, 108b . . . 108i.

A goal is to distribute the stream of parcels 100 at a desired fix pitch P as shown in the final configuration. Fix pitch P or fix pitch value P as used herein is a predefined linear dimension, e.g. a predefined length, wherein each individual parcel 102a, 102b . . . 102i is aligned with the fix pitch P. For example, the leading edge 106a, 106b . . . 106i of each parcel 102a, 102b . . . 102i is placed or distributed equally in accordance with the fix pitch P.

Establishing uniform pitch P defines a final location of a package 102a, 102b . . . 102i in space. The provided approach eliminates a need to account for multiple variables with respect to the processed packages 102a, 102b . . . 102i including lengths of the respective package(s).

A location of a package 102a, 102b . . . 102i in the space is represented by:

$$Xf,i=(i-1)*P \qquad \text{(equation 1),}$$

wherein
Xf, i is the final position of the i-th package [m],
i is the i-th package, and
P is the desired pitch [m].

In an example, the (desired) fix pitch P may comprise a linear dimension, e.g. length, of 20 inches. That means that each parcel 102a, 102b . . . 102i is distributed or placed every 20 inches, in particular the leading edges 106a, 106b . . . 106i of the parcels 102a, 102b . . . 102i are placed every 20 inches. As the final configuration illustrates and in accordance with equation 1, the first parcel 102a, herein also referred to master parcel, is placed at 0 inches, the second parcel 102b is placed at 20 inches, the third parcel 102i is placed at 40 inches etc.

In order to achieve the final configuration, an initial or first position of each package 102a, 102b . . . 102i is determined. Let Xc, i be the initial position of the i-th package 102a, 102b . . . 102i in the string or stream of parcels 100. A parameter that is calculated is a deficit Di in the location of the package 102a, 102b . . . 102i by:

$$Di=Xc,i-Xf,i \qquad \text{(equation 2),}$$

wherein
Di is the deficit [m],
Xc, i is the initial position of the i-th package [m], and
Xf, i is the final position of the i-th package [m].

The deficit Di of the package location corresponds to the desired final position vs initial position.

A gapper or synchronizer may use the information determined for example with equations 1, 2 to adjust speed of its belt(s) or belt segment(s) in order to adjust the position of the packages 102a, 102b . . . 102i. A gapper or synchronizer, such as for example a gapping belt induction conveyor, is used when gaps, such as 104a, 104b . . . 104i, need to be pulled between articles, for example prior to being put through sorters or other processes/systems. This may be achieved by accelerating or decelerating gapping belt speeds to decrease or increase gaps 104a, 104b . . . 104i between packages entering the sorter. This process will be described in more detail with respect to FIG. 5, FIG. 6 and FIG. 7.

Machineability of Package

Figure 2:
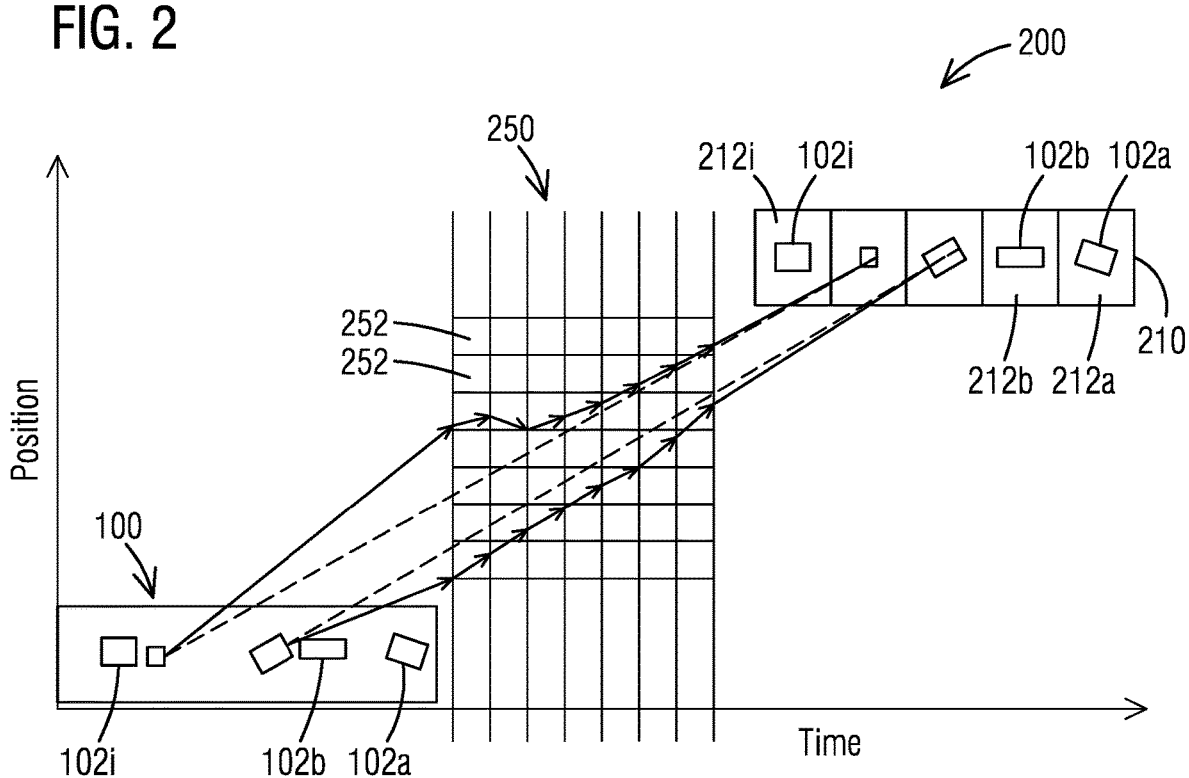
FIG. 2 depicts a schematic view of a first diagram in combination with a belt assembly and stream of articles in accordance with an exemplary embodiment of the present disclosure.

FIG. 2, FIG. 3 and FIG. 4 depict schematic views of first, second and third diagrams in combination with a belt assembly and stream of articles in accordance with exemplary embodiments of the present disclosure.

FIG. 2 illustrates coordinate diagram 200, FIG. 3 illustrates coordinate diagram 300 and FIG. 4 illustrates coordinate diagram 400. In each diagram 200, 300, 400, the x-axis represents time and the y-axis represents position of a package, such as packages 102a, 102b . . . 102i. Over time, positions of the packages 102a, 102b . . . 102i are adjusted according to the desired fixed pitch P.

FIGS. 2, 3 and 4 illustrate sorter tray 210, which may be part of a (bigger) sorter or sortation system. Sorter tray 210 comprises multiple windows or sections 212a, 212b . . . 212i which are adjacent to each other, equal in size and equally distributed. Specifically, a desired fixed pitch P for the packages 102a, 102b . . . 102i corresponds to the sorter tray 210, specifically to length L of each window 212a, 212b . . . 212i. It should be noted that the illustrated sorter tray 210 comprises five window 212a, 212b . . . 212i, but typically comprises many more sections or windows according to for example specifications of the sorter tray 210 or sortation system. Further, an initial configuration of the stream of articles 100 comprising the packages 102a, 102b . . . 102i is shown.

Ideally, as FIG. 2 illustrates, each window 212a, 212b . . . 212i of the sorter tray 210 comprises a package 102a, 102b . . . 102i in accordance or based on the final configuration of the stream of articles 100, as illustrated in FIG. 1.

The coordinate diagrams 200, 300, 400 further illustrate belt assembly 250 comprising a plurality of belts and/or belt segments 252. It should be noted that the belt assembly 250 comprises a minimum of two belts or belt segments 252 but can comprise more than two belts or belt segments 252. A gapper or synchronizer may be used to provide the belt segment 250.

Figure 5:
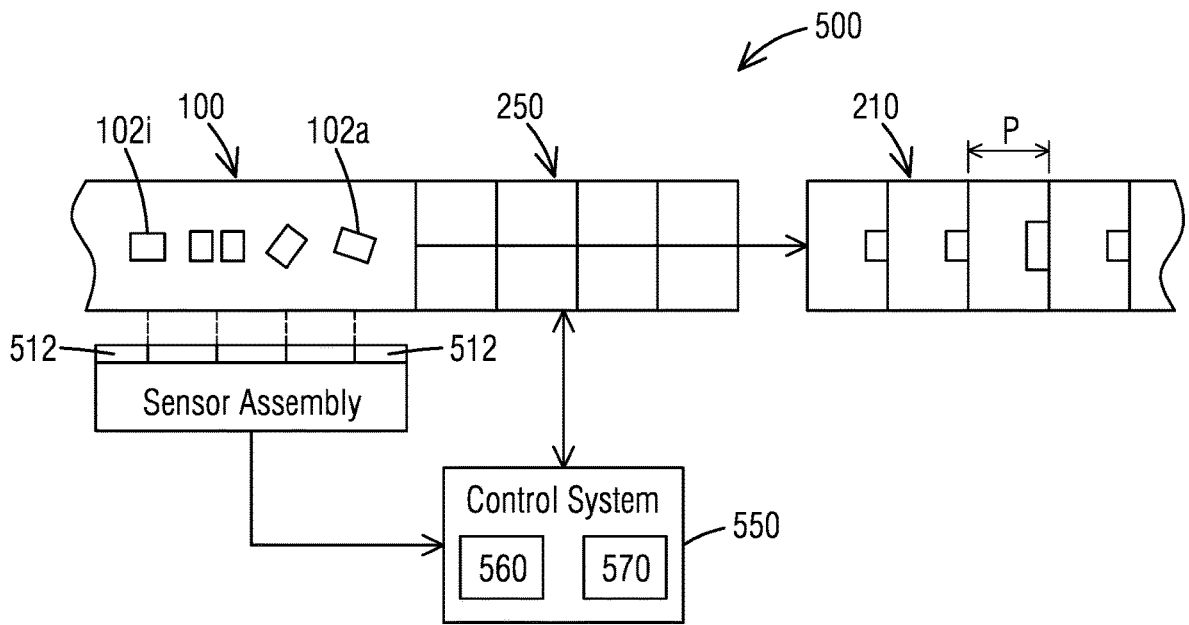
FIG. 5 depicts a schematic view of a system for distributing a stream of articles at a fix pitch in accordance with an exemplary embodiment of the present disclosure.

With reference to FIG. 2, the initial positions of the packages 102a, 102b 102i is determined, for example utilizing a sensor assembly and a control system, see for example FIG. 5. Therefore, pertinent speeds of individual gapper belt segments and/or synchronizer belt segments 252 can be calculated and predetermined.

After determining the initial positions of the packages 102a, 102b . . . 102i, a machinability of each package 102a, 102b . . . 102i is determined. In accordance with an exemplary embodiment, the information including initial positions and calculated/predetermined belt speeds of the belt segments 252 of the belt assembly 250 is used to assess a machinability of a package 102a, 102b . . . 102i. For example, calculated belt speeds may be used to determine if belt speed(s) of individual belts or segments 252 are out of specification. Belts or belt segments 252 typically operate at a specified range of speeds, and calculated speeds may be higher or lower than the specified speed range of a belt segment 252. Additionally, it may also be determined if a belt-to-belt transfer may cause a package to be in push mode. Push mode essentially means that a package 102a, 102b . . . 102i is transferred from a first belt (segment) 252 to a subsequent belt (segment) 252, wherein the subsequent belt segment 252 comprises a higher speed than the first belt (segment) 252 which causes a push of the package (and vice versa pull mode). In FIG. 1, all parcels 102a, 102b . . . 102i are machinable.

Further, it should be noted that the diagrams 200, 300, 400 show non-monotone speeds of the parcels 102a, 102b . . .

102i when entering the belt assembly 250 because the belt segments 252 are operated at different speeds to establish the fix pitch P. After establishing the fix pitch P, which essentially means that the parcels 102a, 102b . . . 102i are aligned and distributed evenly according to the fix pitch P in the sorter tray 210, the packages 102a, 102b . . . 102i travel at monotone speeds.

FIG. 3 and FIG. 4 illustrate that a package 102e may be non-machinable, which essentially means that the package 102e cannot be processed or worked as scheduled or planned and will be processed or machined differently, for example at a different time. If speed(s) of certain belt segments 252 and/or push or pull limitations of the belt segments 252 render a package non-machinable, a window 212a, 212b . . . 212i of the sorter tray 210 may be skipped, see FIG. 3, or a package 102a, 102b . . . 102i may be ejected from the stream of articles 100, see FIG. 4. As FIG. 3 illustrates, window 212e of the sorter tray 210 is skipped and the non-machinable package 102e will be placed in the following window 212f. FIG. 4 illustrates that package 102e is ejected from the stream of articles 100 and may be for example processed later.

FIG. 5 depicts a schematic view of a system 500 for distributing a stream of articles 100 at a fix pitch P in accordance with an exemplary embodiment of the present disclosure. It should be noted that the same reference numbers will be used for the same components described before with reference to FIGS. 1, 2, 3 and 4.

In accordance with an exemplary embodiment of the present disclosure, the system 500 comprises belt assembly 250 comprising a plurality of belt segments 252 carrying the stream of articles 100, a sensor assembly 510 comprising a plurality of sensors 512 and a control system 550 interfacing with the belt assembly 250 and the sensor assembly 51). The sensor assembly 510 provides measurements of initial positions of each article 102a, 102b . . . 102i of the stream of articles 100 and transmits the measurements to the control system 550. The control system 550 utilizes the measurements to determine deficits of the initial positions to final positions for each article 102a, 102b . . . 102i based on the predefined pitch value P, and controls a speed of one or more of the plurality of belt segments 252 to provide the final positions for each article 102a, 102b . . . 102i according to the predefined pitch value P.

The sensor assembly 510 comprises one or more sensors 512, such as for example video cameras, photo arrays, light barriers etc., that detect, measure and/or track real-time positions and/or orientations of the parcels 102a, 102b . . . 102i. Essentially, the sensor assembly 510 comprises optical means configured to determine the initial configuration of the stream of articles 100. The sensor assembly 510 transmits initial position/configuration data to the control system 550. The control system 550 comprises at least one processor 560 and is configured to at least perform a method as described herein by executing computer readable instructions or an algorithm describing the method and stored in memory 570. The control system 550 will be described in more detail with reference to FIG. 8.

In an embodiment, the control system 550 is configured to calculate a deficit of the initial position of each package 102a, 102b . . . 102i with respect to a desired final position based on the fix pitch P, according to for example equation 1 and equation 2 as described before. The control system 550 is further configured to control speed(s) of one or more belts or belt segments 252 of the belt assembly 250 to provide or achieve the final position of the package 102a, 102b . . . 102i with fix pitch P.

Kinematic Approach to Adjust Belt Speed and Establish a Pitch

Figure 6:
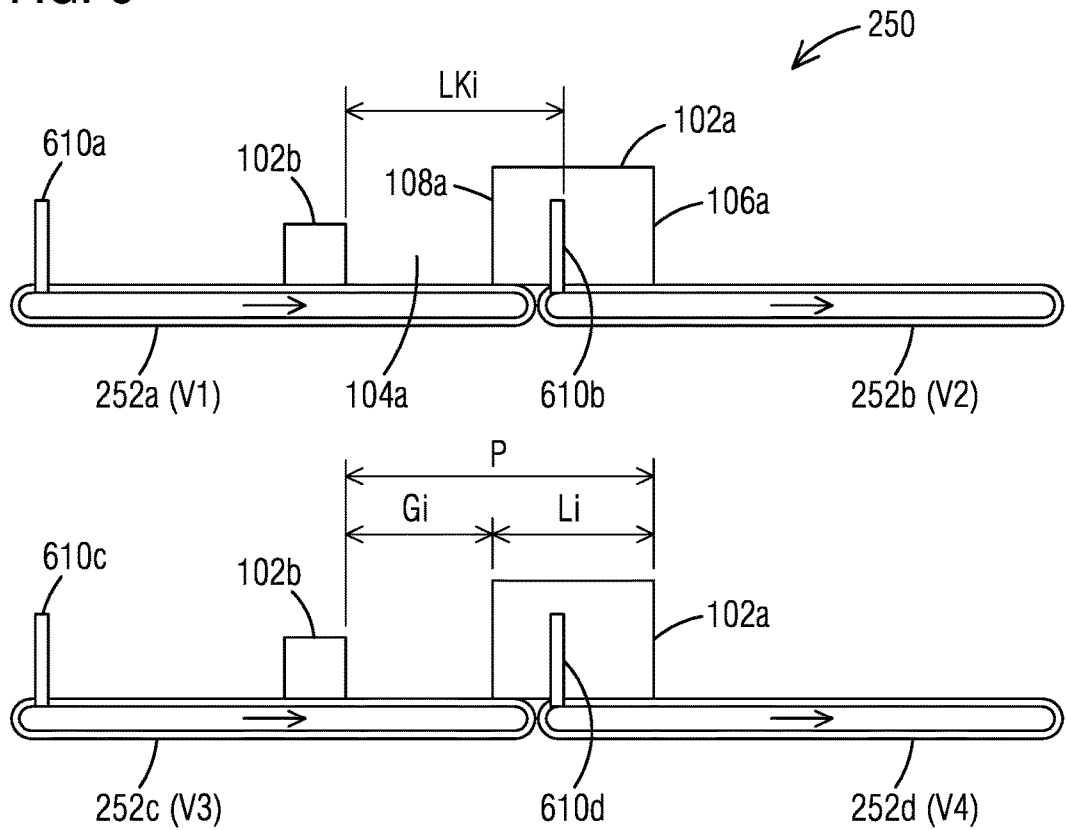
FIG. 6 depicts a schematic view of a section of a belt assembly in accordance with an exemplary embodiment of the present disclosure.

FIG. 6 depicts a schematic view of a section of a belt assembly 250 in accordance with an exemplary embodiment of the present disclosure.

Belt assembly 250 comprises multiple belt or belt segments 252, including first belt or belt segment 252a, second belt or belt segment 252b, third belt or belt segment 252c and fourth belt or belt segment 252d. Further, packages 102a, 102b are shown. Each belt or belt segment 252 comprises a sensor 610a, 610b, 610c, 610d, which comprise for example light barriers. The sensors 610a, 610b, 610c, 610d may be part of the sensor assembly 510 or may be provided separately. The sensors (light barriers) 610a, 610a, 610c, 610d are each arranged at a beginning of each belt or belt segment 252, so that when a package 102a, 102b enters or is transferred to the respective belt segment, the package 102a, 102b is detected and package-related data are obtained.

First belt 252a is operated at first constant speed V1. Speed V2 of the second belt 252b is to be adjusted (increased or decreased compared to V1) in order to establish the desired fix pitch P. The arrows indicate the direction of travel of the belts 252.

When calculating or determining the second speed V2, a length Li of a package 102a and immediate trailing gap Gi is known. In our example, length Li and trailing gap Gi of first package 102a may be measured by first light barrier 610. Span/distance LKi is the sum of the trailing gap length Gi and a location of the trailing edge 108a of the package 102a with respect to its center. It is assumed that the center of a package is the center of gravity of the respective belt or belt segment 252. For the package 102a to be able to follow speed V2 of the second belt 252b, the center of the package 102a should align with the speed V2. The span LKi traveled on the first belt 252a kinetically isolates the package 102a with respect to the second following package 102b.

As noted before, the speed V2 of the second belt 252b is to be adjusted (increased or decreased compared to V1) in order to establish the desired fix pitch P. The speed V2 is calculated using the following equations.

A corresponding time duration is calculated by:

$$tpi = V1/LKi \qquad \text{(equation 3)},$$

wherein
tpi is a corresponding time duration [1/s]
V1 is the speed of the first belt [m/s], and
LKi is the length of the trailing gap Gi and location of the trailing edge of a package with respect to its center [m].

The speed V2 may be calculated by:

$$(V2-V1)*tpi = Di \qquad \text{(equation 4)},$$

hence $$V2 = Di/tpi + V1 \qquad \text{(equation 5)}$$

wherein
V1 is the speed of the first belt [m/s],
V2 is the speed of the second belt [m/s],
tpi is the corresponding time duration [1/s], and
Di is the deficit [m] (see equation 2).

When utilizing the kinematic approach to establish the pitch P, the length of the subsequent package 102b is eliminated.

Once the pitch P, which is essentially the location or position of the leading edge 106 of the packages 102, is established uniformly, a gap/distance 104 between packages 102 can be established, leading to the fix pitch P. A deficit in a desired gap Gdi can be calculated by:

$$Gi = P - Li \quad \text{(equation 6)}$$

wherein
Gi is the length of the trailing gap [m],
P is the desired pitch [m] (see equation 1), and
Li is the length of the package [m].
The deficit in the can be calculated by:

$$Gdi = Gi - G \quad \text{(equation 7)},$$

wherein
Gdi is the gap deficit [m],
Gi is the existing gap between packages [m], and
G is the desired gap [m].

In another embodiment of the present disclosure, the gap 104 may be established by:

$$tgi = V3/(Li/2 + Gi) \quad \text{(equation 8)},$$

$$(V4 - V3) * tgi = Gdi \quad \text{(equation 9), and}$$

$$V4 = Gdi/tgi + V3 \quad \text{(equation 10)},$$

wherein
tgi is the gap time duration [1/s],
V3 is the speed of the third belt [m/s],
V4 is the speed of the fourth belt [m/s],
Li is the length of the respective package [m], and
Gdi is the gap deficit [m].

It should be noted that although FIG. 6 depicts four belts or belt segments 252a, 252b, 252c, 252d, the system 500 may only require three belts since the second belt 252b and the third belt 252c may be the same belt or belt segment. However, for practical implementation, two (middle) belts 252b, 252c may provide a passive buffer instead of only one middle belt.

Look Up Table Approach to Adjust Belt Speed

Figure 7:
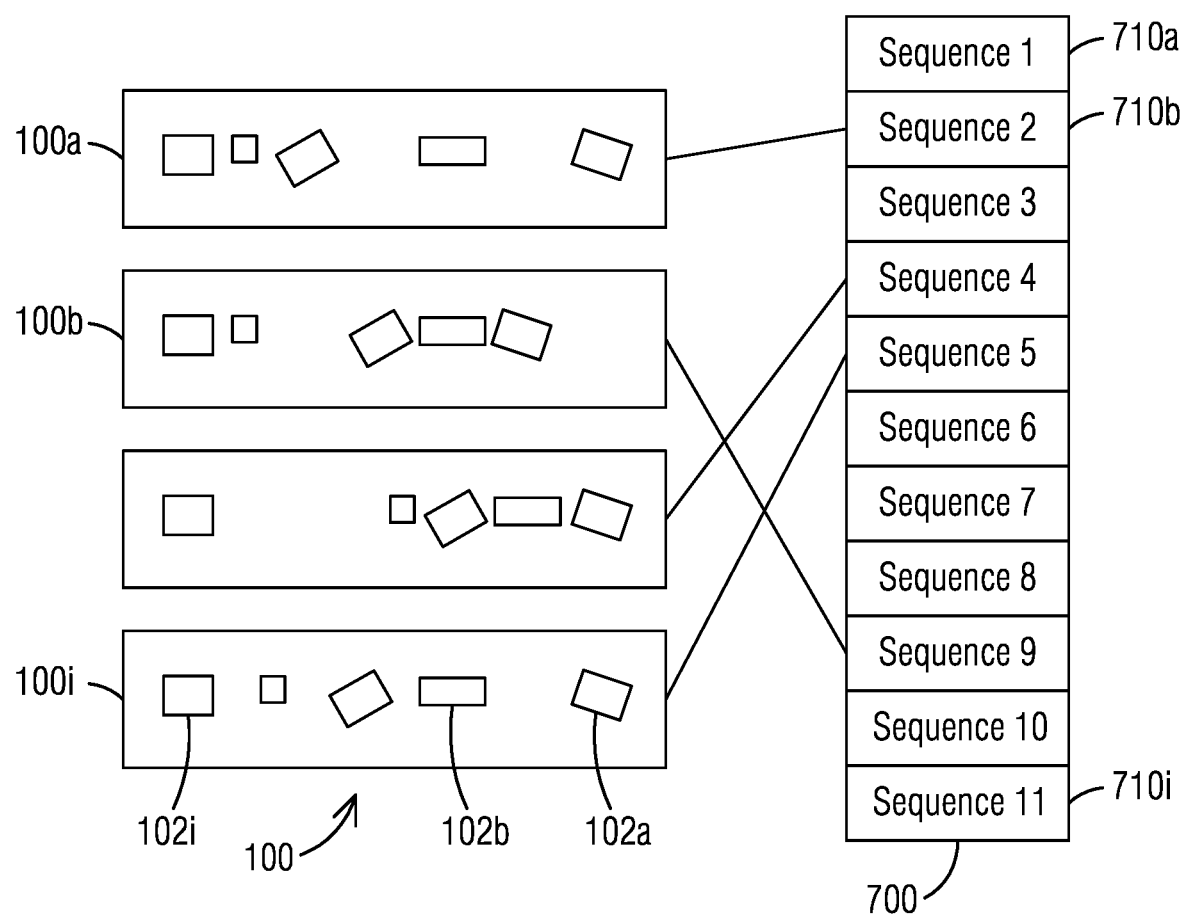
FIG. 7 depicts a schematic diagram of a look up table to adjust a belt speed in accordance with an exemplary embodiment of the present disclosure.

FIG. 7 depicts a schematic diagram of a look up table to adjust a belt speed in accordance with an exemplary embodiment of the present disclosure. In another embodiment of the present disclosure, a look up table approach may be used to adjust belt speed(s) to achieve the desired fixed pitch P.

Typically, the information and data from the sensors 512 of the sensor assembly 510 and/or sensors 610 and calculated speed adjustments based on sensor feedback (see kinematic approach) are used for package speed reconfiguration. However, as illustrated in FIG. 7, a lookup table 700 of belt speed sequences 710a, 710b . . . 710i may be created and utilized for the configuration of the packages 102a, 102b . . . 102i.

The look up table 700 comprises multiple belt speed sequences which relate to one or more input stream of articles 100. FIG. 7 shows exemplary four different initial configurations of input streams 100, wherein each input stream 100 may be related to one or more sequences 710a, 710b . . . 710i. For example, input stream 100a may relate to sequence2 710b, which means that when an initial configuration of an input stream is recognized as a pattern as shown in 100a, the belt or belt segments 252 of belt assembly 250 are controlled by the control system 550 utilizing pre-created controlling sequence2 710b. It should be noted that an input stream 100a, 100b . . . 100i may relate to one or more sequences 710a, 710b . . . 710i, for example two sequences may be combined.

Figure 8:
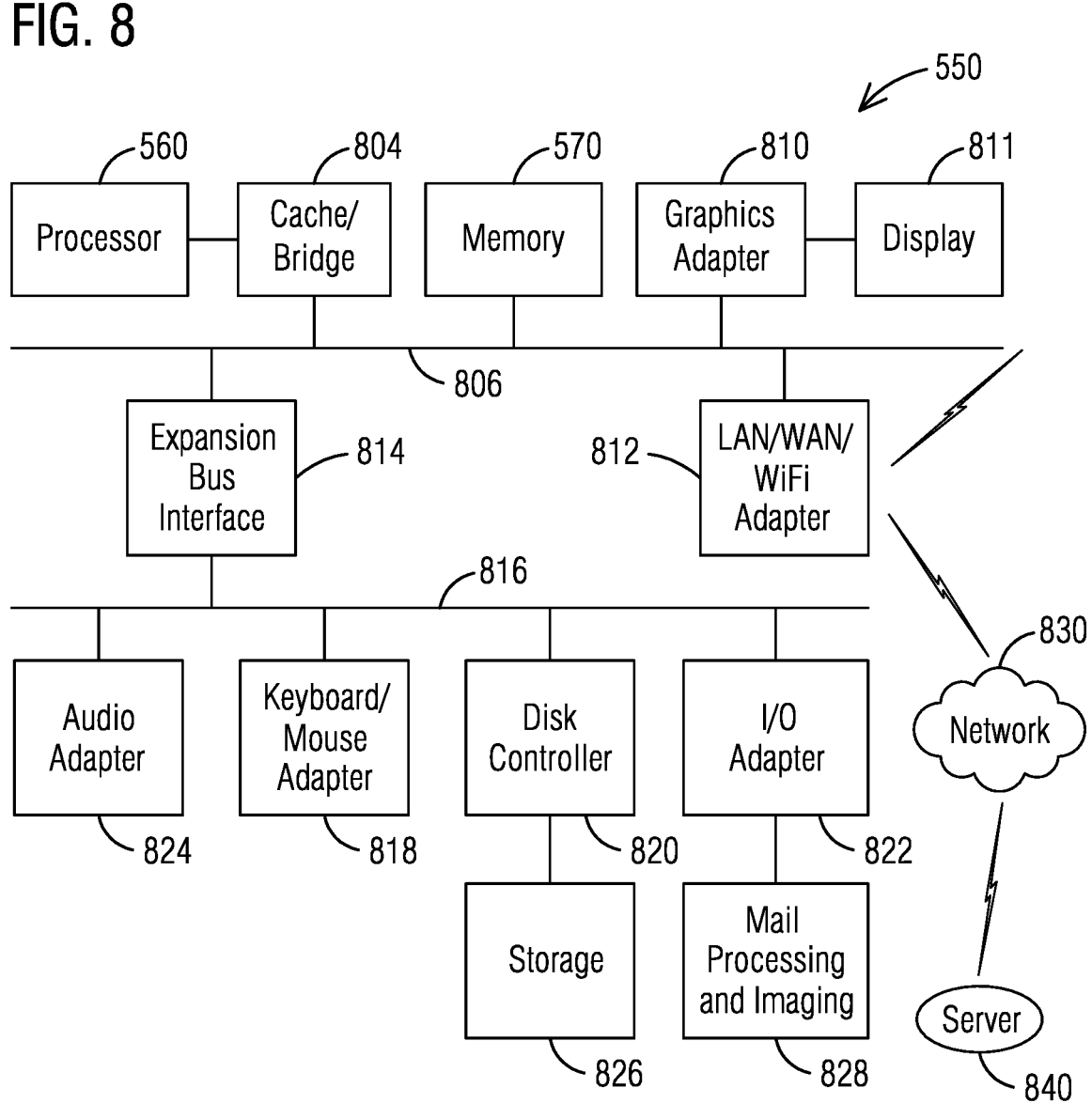
FIG. 8 depicts a block diagram of a control system in which an embodiment of the present disclosure can be implemented.

FIG. 8 depicts a block diagram of a control system, herein also referred as a data processing system, in which an embodiment can be implemented, for example as a control system 550 for a mechanism as described before and can be configured to perform processes as described herein.

The control system 550 depicted includes processor 560 connected to a level two cache/bridge 804, which is connected in turn to a local system bus 806. Local system bus 806 may be, for example, a peripheral component interconnect (PCI) architecture bus. Also connected to local system bus 806 in the depicted example are a main memory 570 and a graphics adapter 810. The graphics adapter 810 may be connected to display 811.

Other peripherals, such as local area network (LAN)/wide area network (WAN)/Wireless (e.g., Wi-Fi) adapter 812, may also be connected to local system bus 806. Expansion bus interface 814 connects local system bus 806 to input/output (I/O) bus 816. I/O bus 816 is connected to keyboard/mouse adapter 818, disk controller 820, and I/O adapter 822. Disk controller 820 can be connected to a storage 826, which can be any suitable machine usable or machine readable storage medium, including but not limited to non-volatile, hard-coded type mediums such as read only memories (ROMs) or erasable, electrically programmable read only memories (EEPROMs), magnetic tape storage, and user-recordable type mediums such as floppy disks, hard disk drives and compact disk read only memories (CD-ROMs) or digital versatile disks (DVDs), and other known optical, electrical, or magnetic storage devices.

I/O adapter 822 can be connected to mail processing and imaging devices 828, for example to image, scan, transport, label, address-process, sort, and otherwise processes the articles, such as packages 102a, 102b . . . 102i, in accordance with the various embodiments described herein. Also connected to I/O bus 816 in the example shown is audio adapter 824, to which speakers (not shown) may be connected for playing sounds. Keyboard/mouse adapter 818 provides a connection for a pointing device (not shown), such as a mouse, trackball, track-pointer, etc.

Those of ordinary skill in the art will appreciate that the hardware depicted in FIG. 8 may vary for particular implementations. For example, other peripheral devices, such as an optical disk drive and the like, also may be used in addition or in place of the hardware depicted. The depicted example is provided for the purpose of explanation only and is not meant to imply architectural limitations with respect to the present disclosure.

LAN/WAN/Wireless adapter 812 can be connected to a network 830 (not a part of data processing system 550), which can be any public or private data processing system network or combination of networks, as known to those of skill in the art, including the Internet. LAN/WAN/Wireless adapter 812 can also communicate with packages 102a, 102b . . . 102i as described herein and perform other data processing system or server processes described herein. Data processing system 550 can communicate over network 830 with one or more server systems 840, which are also not part of data processing system 550, but can be implemented, for example, as separate data processing systems. A server system 840 can be, for example, a central server system at a central mail processing facility.

The invention claimed is:

1. A system for distributing a stream of articles at a fix pitch comprising:
a belt assembly comprising a plurality of belt segments carrying a stream of articles,
a sensor assembly comprising a plurality of sensors,
a control system interfacing with the belt assembly and the sensor assembly, wherein the sensor assembly provides measurements of initial positions of each article of the stream of articles and transmits the measurements to the control system, wherein the control system utilizes the measurements to determine deficits of the initial positions to final positions for each article based on a predefined pitch value, wherein the control system controls a speed of the plurality of belt segments to provide the final positions for each article according to the predefined pitch value, and wherein the control system, after determining the initial positions of each article, determines a machinability of each article.

2. The system of claim 1, wherein the control system calculates a deficit of an initial position with respect to a final position of a first article based on the predefined pitch value.

3. The system of claim 2, wherein the control system calculates and controls the speed of at least one belt segment in order to establish the fix pitch value for the first article.

4. The system of claim 3, wherein the sensor system measures a length and a trailing gap length of the first article and transmits the length and trailing gap length to the control system.

5. The system of claim 4, wherein a first belt segment comprises a constant belt speed, wherein a speed of a second belt segment is calculated based on the constant belt speed of the first belt segment, the deficit of the first article and a sum of the trailing gap length and a location of the trailing edge with respect to a center of the first article.

6. The system of claim 1, wherein the stream of articles comprises parcels or packages.

7. The system of claim 6, wherein the control system is configured to select one or more belt speed sequences based on the measurements provided by the sensor assembly to control the speed of the plurality of belt segments.

8. The system of claim 1, wherein the control system comprises a memory storing a look up table, the look up table comprising a plurality of belt speed sequences relating to different initial configurations of streams of articles.

9. A method for distributing a stream of articles at a fix pitch value comprising:
through operation of at least one processor in a control system configured via executable instructions included in at least one memory:
receiving measurements of initial positions of a stream of articles travelling on a first belt segment,
determining deficits in the initial positions with respect to final positions based on a predefined pitch value,
controlling a speed of a second belt segment such that the stream of articles comprises the final positions including the predefined pitch value, and
after determining the initial positions of the stream articles, determining a machinability of each of the stream of articles.

10. The method of claim 9, further comprising:
calculating a deficit of the initial positions with respect to the final positions for each article utilizing measurements provided by a sensor assembly.

11. The method of claim 10, wherein the sensor assembly measures the length and trailing gap length of each article and transmits measurements to the control system.

12. The method of claim 10, further comprising:
calculating the speed of the second belt segment utilizing the length and trailing gap length of each article.

13. The method of claim 12, wherein calculating the speed of the second belt segment is based on the deficit, a speed of the first belt segment and a sum of a trailing gap length of an article and a location of a trailing edge with respect to a center of the respective article.

14. The method of claim 9, further comprising:
recognizing a configuration of the initial positions of the stream of articles, selecting a belt speed sequence stored in a look up table, and
controlling the speed of the second belt segment according to a selected belt speed sequence.

15. A non-transitory computer readable medium comprising instructions that when executed by at least one processor perform a method for distributing a stream of articles at a fix pitch value comprising:
receiving measurements of initial positions of a stream of articles travelling on a first belt segment,
determining deficits in the initial positions with respect to final positions based on a predefined pitch value,
controlling a speed of a second belt segment such that the stream of articles comprises the final positions including the predefined pitch value, and
after determining the initial positions of the stream of articles, determining a machinability of each of the stream of articles.

* * * * *

UNITED STATES PATENT AND TRADEMARK OFFICE
CERTIFICATE OF CORRECTION

PATENT NO. : 11,724,887 B2
APPLICATION NO. : 17/288108
DATED : August 15, 2023
INVENTOR(S) : Dwivedi It is certified that error appears in the above-identified patent and that said Letters Patent is hereby corrected as shown below:

In the Specification

Column 1, Line 20:
"as" should be — is —

Column 3, Line 39:
After "to" insert -- as --

Column 4, Line 21:
"window" should be — windows —

Column 5, Line 34:
"51)" should be — 510 —

Column 6, Line 14 (2nd occurrence):
"610a" should be — 610b —

Column 7, Line 9:
Delete "in the"

Column 7, Line 52:
"stream" should be — streams —

Column 7, Lines 57, 61:
"sequence2" should be — sequence 2 —

Column 7, Line 59:
After "in" insert -- stream --

Signed and Sealed this
Twenty-fifth Day of June, 2024

Katherine Kelly Vidal
*Director of the United States Patent and Trademark Office*

CERTIFICATE OF CORRECTION (continued)
U.S. Pat. No. 11,724,887 B2

Column 7, Line 66:
After "referred" insert -- to --

Column 8, Line 29:
"processes" should be — process —